United States Patent
Neelakantan

(10) Patent No.: US 7,891,261 B2
(45) Date of Patent: Feb. 22, 2011

(54) CLUTCH ACTUATION SYSTEM WITH LOCKING MECHANISM AND METHOD OF CONTROLLING ENGAGEMENT OF A CLUTCH

(75) Inventor: Vijay A. Neelakantan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 799 days.

(21) Appl. No.: 11/839,679

(22) Filed: Aug. 16, 2007

(65) Prior Publication Data

US 2009/0045028 A1    Feb. 19, 2009

(51) Int. Cl.
*F16H 59/04*    (2006.01)
*G05G 11/00*    (2006.01)
*F16D 29/00*    (2006.01)

(52) U.S. Cl. .................. 74/335; 74/479.01; 192/70.22; 192/83; 192/84.6; 192/85.01; 192/114 R

(58) Field of Classification Search ............... 192/70.22
See application file for complete search history.

(56) References Cited

U.S. PATENT DOCUMENTS

| | | | | |
|---|---|---|---|---|
| 5,348,123 A * | 9/1994 | Takahashi et al. | ........... | 188/72.1 |
| 6,581,730 B1 * | 6/2003 | Haydon et al. | ............. | 188/71.5 |
| 6,626,269 B2 * | 9/2003 | Shaw et al. | ................. | 188/71.7 |
| 6,976,563 B1 * | 12/2005 | Shaw | .......................... | 188/265 |
| 2002/0153772 A1 * | 10/2002 | Bunker | ....................... | 188/71.5 |
| 2007/0062769 A1 * | 3/2007 | Noh | ............................ | 188/265 |

* cited by examiner

*Primary Examiner*—Rodney H Bonck
(74) *Attorney, Agent, or Firm*—Quinn Law Group, PLLC

(57) ABSTRACT

A clutch actuation system for engaging and disengaging a clutch includes a hydraulically-actuated piston movable in response to hydraulic pressure to an apply position in which the piston is operable to engage the clutch. An electro mechanical actuator is movable in response to electric power to contact the piston at the apply position such that the clutch is maintained in an engaged state by the actuator, thereby permitting hydraulic pressure to be released. A method of controlling engagement of the clutch is also provided.

8 Claims, 2 Drawing Sheets

CLUTCH ACTUATION SYSTEM WITH LOCKING MECHANISM AND METHOD OF CONTROLLING ENGAGEMENT OF A CLUTCH

TECHNICAL FIELD

The invention relates to an actuation system for a clutch that combines hydraulic and electro-mechanical actuation to allow the clutch to be mechanically locked in an engaged state to reduce hydraulic pressure requirements.

BACKGROUND OF THE INVENTION

In automatic transmissions, torque-transmitting mechanisms such as friction clutches and brakes are selectively engaged using hydraulic pressure provided by a transmission pump. Transmission efficiency can be improved by reducing the required pump size and minimizing hydraulic pressure requirements in the transmission. Improved transmission efficiency leads to fuel economy improvement.

SUMMARY OF THE INVENTION

A clutch actuation system for engaging and disengaging a clutch is provided that utilizes both hydraulic actuation and electro-mechanical actuation in order to minimize hydraulic pressure requirements. Specifically, the clutch actuation system includes a hydraulically-actuated piston movable in response to hydraulic pressure to an apply position in which the piston causes to engagement of the clutch. Within the scope of the invention, a "clutch" may be a brake-type clutch or a rotating-type clutch. The clutch actuation system also includes an electro-mechanical actuator movable in response to electric power to contact the piston at the apply position and thereby maintain the clutch in the engaged state so that hydraulic pressure is not required to maintain the engaged state, and may be released. Preferably, a direct current (DC) motor is used to provide electrical power to the actuator, causing movement of the actuator to contact the piston, and the actuator has a self-locking feature that prevents movement of the actuator in the absence of electrical power thereto. A battery powers the DC motor via a controller which operatively connects the battery to the electric motor to control the flow of power from the battery to the motor. For example, in one embodiment, the actuator includes a self-locking lead screw and a nut threadingly engaged thereon. The nut travels axially in response to rotation of the lead screw caused by the electric power thereto. Preferably, an axial thrust bearing is positioned concentrically about the lead screw and absorbs axial force acting the lead screw. The self-locking feature of the lead screw prevents the nut from traveling axially in the absence of electrical power to the lead screw. The nut includes axial leads that contact the piston when the nut is moved toward the piston. When the nut contacts the piston with sufficient pressure, the nut will cease to rotate and the DC motor will stall. This causes current drawn by the DC motor to increase rapidly, and the DC motor to be switched off.

The actuator will remain in the contact position, contacting the clutch to keep it engaged, and hydraulic pressure on the piston may be released. When the clutch is not engaged, a first clutch member is relatively rotatable with respect to a second clutch member. When the clutch is engaged, the first clutch member is not rotatable relative to the second clutch member.

Hydraulic pressure is provided by a hydraulic pressure source such as a transmission pump. A valve such as in a transmission valve body controls the flow of pressurized hydraulic fluid to a hydraulic chamber formed by a housing, such as the transmission housing. The hydraulic chamber is in fluid communication with the pressure source and with the clutch apply piston. The valve of the hydraulic chamber is controlled so that pressurized fluid is provided to the chamber to initially engage the clutch and to empty from the hydraulic chamber when the actuator locks the clutch in the engaged state.

The clutch actuation system permits a method of controlling engagement of the transmission clutch. The method includes directing pressurized fluid to an apply piston to thereby move the piston into contact with the clutch to engage the clutch. After directing the pressurized fluid, the method includes providing electrical power to an actuator to thereby move the actuator into contact with the piston. Electrical power is ceased when the actuator contacts the piston. Preferably, this occurs automatically due to a surge in current in the motor when the actuator contacts the piston. After providing electrical power to the actuator, the method includes releasing the pressurized fluid so that the clutch remains in the engaged state via the actuator without electrical power or fluid pressure.

If it is determined that operating conditions warrant disengagement of the transmission clutch, the method includes directing pressurized fluid to the apply piston with the clutch in the engaged state, and then providing electrical power to the actuator to move the actuator out of contact with the piston. When the actuator is out of contact with the piston, the method includes releasing the pressurized fluid so that the apply piston moves out of contact with the clutch and the clutch is released to a disengaged state.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
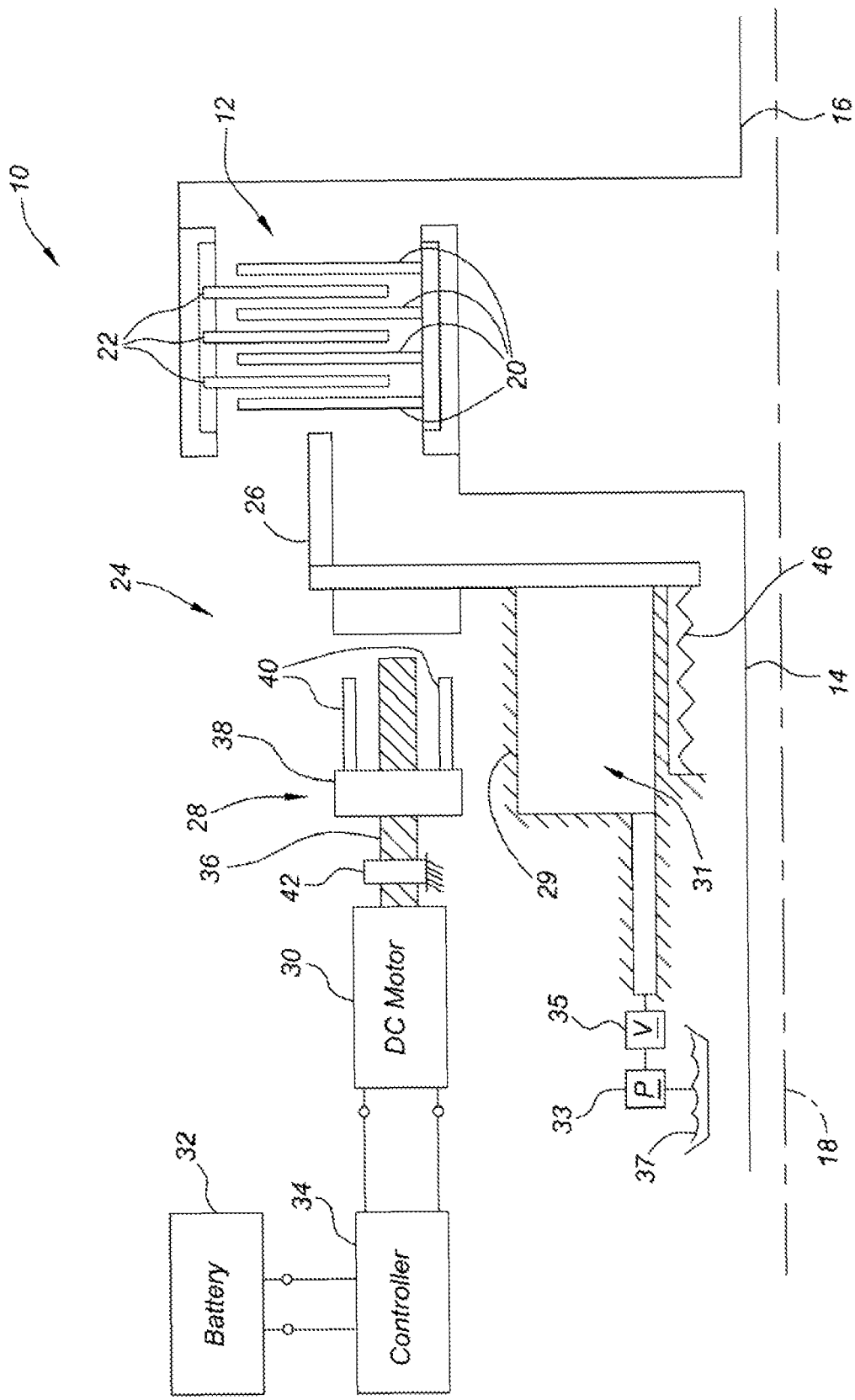
FIG. 1 is a schematic illustration of the clutch actuation system for a transmission with a clutch in a disengaged state.
Figure 2:
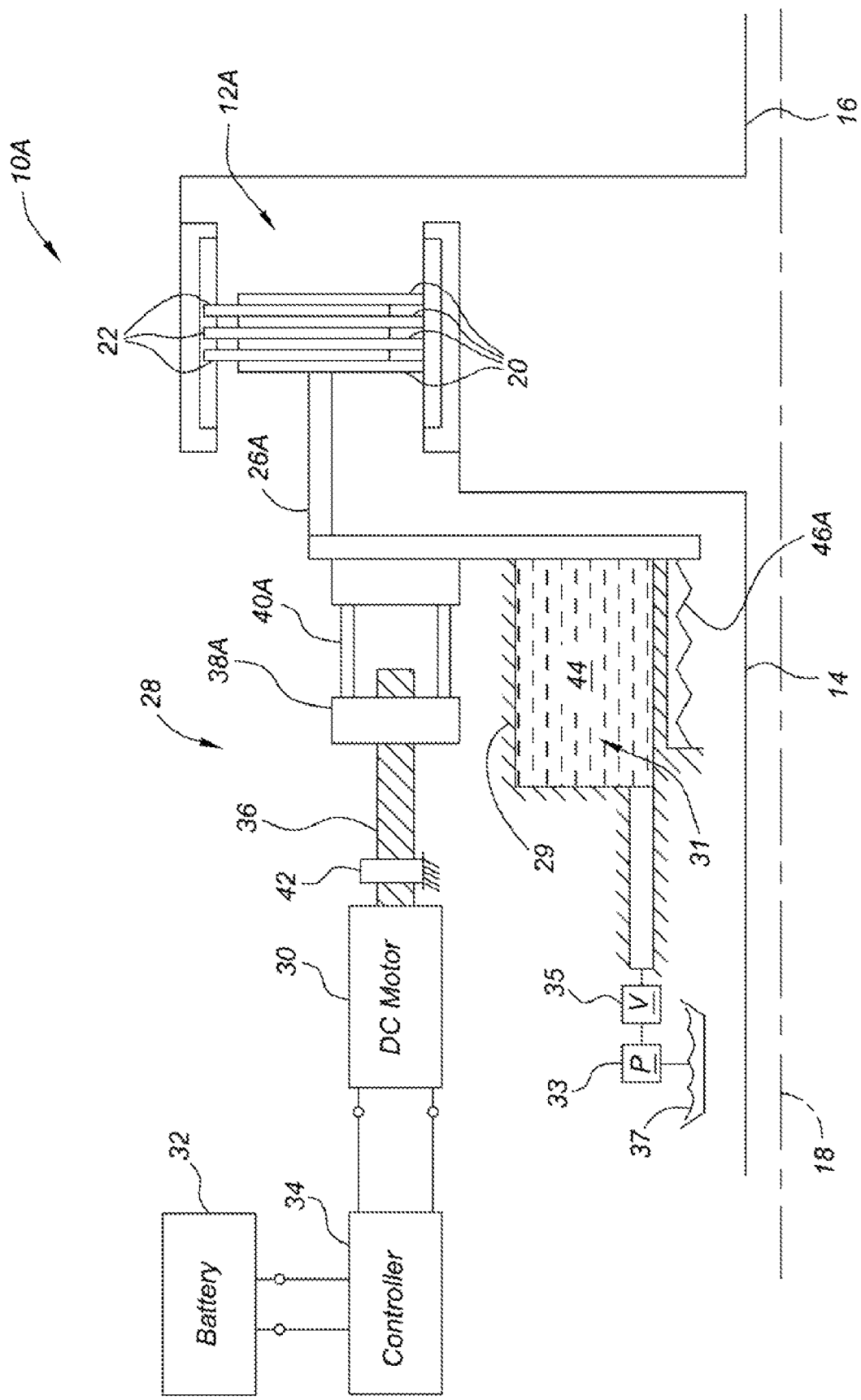
FIG. 2 is a schematic illustration of the clutch actuation system of FIG. 1 with the clutch in an engaged state.

Referring to the drawings, where like reference numbers refer to like components, FIG. 1 shows a portion of a transmission 10 including a torque-transmitting mechanism or clutch 12 which is engageable to connect a first clutch member also referred to as an input member 14, for common rotation with the second clutch member also referred to as an output member 16. The first clutch member 14 is rotatable about a transmission centerline 18. A first set of clutch plates 20 extend radially from the first clutch member 14. In FIG. 1, the clutch 12 is shown in unengaged or disengaged states. In the disengaged state, a second set of clutch plates 22 that extend radially from the second clutch member 16 are not in contact with the first set of clutch plates 20. In FIG. 2, the clutch 12 is shown in an engaged state, in which the clutch is referred to as 12A, with the first set of clutch plates 20 in contact with the axially adjacent second set of clutch plates 22 and the transmission is referred to as 10A. When the clutch is in the engaged state 12A in FIG. 2, the first clutch member 14 rotates commonly with the second clutch member 16. It should be appreciated that, within the scope of the invention, the clutch 12 may be a stationary type clutch in which a second clutch member is being a stationary housing, rather than a rotatable component like output member 16, so that when the clutch 12 is engaged, the first clutch member 14 is grounded to the stationary housing.

Referring again to FIG. 1, the clutch actuation system 24 is utilized to transition the clutch 12 between the disengaged state in FIG. 1 and the engaged state 12A of FIG. 2. The clutch actuation system 24 includes a hydraulically-actuated apply piston 26. In FIG. 1, the apply piston 26 is in a release position corresponding with the disengaged state of the clutch 12A. A transmission housing 29 forms a hydraulic chamber 31 juxtaposed with the apply piston 26. A hydraulic pressure source, such as a pump 33 for transmission hydraulic and lubrication needs, is in selectively communication with the hydraulic chamber 31 through a valve mechanism 35 such as a transmission valve body or other valves to control the flow of fluid derived from a fluid source 37 and pressurized by the pump 33 and then supplied to the hydraulic chamber 31. In FIG. 1, the hydraulic chamber 31 does not contain hydraulic fluid of sufficient pressure to move the apply piston 26 from the release position shown in FIG. 1 to an apply position 26A shown in FIG. 2. The hydraulic chamber 31 is depicted as being empty of fluid in FIG. 1; however, the hydraulic chamber 31 need not be completely empty, and may contain fluid when the clutch 12 is in the disengaged state, as long as the fluid is at a pressure less than that required to move the apply piston 26 from the release position.

In addition to the hydraulic pressure system established by the pump 33, the valve mechanism 35, the fluid source 37 and the hydraulic chamber 31, the clutch actuation system 24 also includes an electro-mechanical actuator 28. The electro-mechanical actuator 28 is electrically powered by a direct current (DC) motor 30. An electrical power source 32, such as a battery supplies power to the DC motor 30 selectively through the controller 34. The electro-mechanical actuator 28 includes a self-locking lead screw 36 (also referred to as a first member) which is rotatable in a clockwise or a counterclockwise direction, depending on the power supplied to the DC motor 30. The electro-mechanical actuator 28 further includes an axial travel nut 38, also referred to herein as a contacting member, which includes axial leads 40. The axial travel nut 38 is threadingly engaged with the lead screw 36. When the lead screw 36 rotates in a clockwise direction, the axial travel nut 38 moves axially toward the clutch 12 and apply piston 26. When the lead screw 36 is rotated in a counter clockwise direction, the axial travel nut 38 moves axially away from the apply piston 26 and the clutch 12. The lead screw 36 is a self-locking lead screw, which will be rotated by electrical power to drive the travel nut 38 axially, but will not rotate due to force applied to the travel nut 38. That is, the travel nut 38 cannot drive the lead screw 36. An axial thrust bearing 42 is concentrically arranged about the lead screw 36 to absorb axial forces on the lead screw 36. Other mechanisms configured to provide a self-locking feature, such as a worm gear with a pinion thereon, may be utilized in place of a lead screw or a axial travel nut. Those skilled in the art will recognize various structures self-locking mechanisms such as this.

In FIG. 1, the axial travel nut 38 is shown out of contact with the apply piston 26, consistent with the clutch 12 being in a disengaged state. In order to engage the clutch 12, pressurized fluid 44 is directed from the pump 33 to the hydraulic chamber 31 filling the hydraulic chamber 31 in FIG. 2, as depicted by dashed lines. The hydraulic pressure acts on the apply piston to move it to the apply position 26A of FIG. 2, thus causing the first and second sets of clutch plates 20, 22 to contact one another, thereby engaging the clutch as shown as 12A in FIG. 2.

After the clutch is engaged as (shown as 12A) using the hydraulic pressure, the electro-mechanical actuator 28 is electrically powered so that the DC motor 30 turns the lead screw 36 in a clockwise direction, thereby causing the axial travel nut 38 to move from the out of contact position shown in FIG. 1 to a contact position in which the nut is referred to as 38A in FIG. 2. In the contact position, the axial leads contact the apply piston 26 and are shown in the contacting position as 40A in FIG. 2. When the axial leads are in the contact position 40A, in physical contact with the apply piston in the apply position 26A, the nut 38A (shown in FIG. 2) stops rotating and the DC motor 30 stalls. When the DC motor 30 stalls, current drawn by the DC motor 30 increases rapidly and the controller 34 switches off the motor 30. Even in the absence of electrical power, the self-locking feature of the lead screw 36 will maintain the axial travel nut 38 in the contact position 40A, thus holding the apply piston in the apply position 26A, and the clutch 12A in the engaged state. With the electro-mechanical actuator 28 effectively locking the clutch in the engaged state 12A, the pressurized fluid 44 may be released or emptied from the hydraulic chamber 31, preferably by the controller 34 opening the valve mechanism 35 to allow draining of the hydraulic chamber 31. Thus, the clutch is maintained in the engaged state 12A without hydraulic pressure or electrical power being required (that is the clutch is mechanically-locked). Such a mechanically-locked, engaged state of the clutch shown as 12A (FIG. 2) is desirable during steady state operating conditions, such as highway driving at high speeds in a gear ratio that requires the clutch 12 to be engaged for long periods of time. Because hydraulic pressure will not be required to maintain the clutch 12 during that period of time, pump requirements and hydraulic pressure requirements are minimized thereby potentially increasing fuel economy.

When operating conditions warrant releasing the clutch to the disengaged state 12 shown in FIG. 1, the controller 34 will first direct pressurized fluid 44 to the empty or at least insufficiently pressurized hydraulic chamber 31, and then provide electrical power from the battery 32 to the DC motor 30 to rotate the lead screw 36 in a counter clockwise direction, thus moving the axial travel nut 38 back to the out of contacting position 40A of FIG. 1. The hydraulic pressure in the hydraulic chamber 31 can be slowly released so that the apply piston moves from the apply position 26A of FIG. 2 to the release position 26 of FIG. 1. A return spring 46, shown in FIG. 1 in a retracted position guides the apply piston from the contact position 26A in which the return spring is shown in an extended state 46A to the retracted position in which the apply piston 26 shown is in the release position. Thus, the spring 46 biases to the apply piston 26 to the release position.

While the best modes for carrying out the invention have been described in detail, those familiar with the art to which this invention relates will recognize various alternative designs and embodiments for practicing the invention within the scope of the appended claims.

The invention claimed is:

1. A clutch actuation system for engaging and disengaging a clutch, comprising:
    a hydraulically-actuated piston movable in response to hydraulic pressure to an apply position in which the piston is operable to engage the clutch;
    an electro-mechanical actuator movable in response to electric power to contact the piston at the apply position such that the clutch is maintained in an engaged state by the actuator, thereby permitting the hydraulic pressure to be released; wherein the actuator has a self-locking feature that prevents movement of the actuator in the absence of electrical power thereto; wherein the actuator includes a self-locking lead screw and a nut threadingly engaged thereon; wherein the nut travels axially in response to rotation of the lead screw; wherein the self-locking lead screw prevents the nut from traveling axially without the motor turning the lead screw; and wherein the nut includes axial leads that contact the piston when the nut is moved toward the piston.

2. The clutch actuation system of claim 1, further comprising:
   a spring operatively connected to the piston and biased to move the piston to a return position out of contact with the clutch when the hydraulic pressure is released.

3. A clutch actuation system comprising:
   a transmission clutch having a first clutch member with a first set of plates and a second clutch member with a second set of plates, the first clutch member being relatively rotatable with respect to the second clutch member about an axis of rotation when the clutch is not engaged and not relatively rotatable with respect to the second clutch member when the clutch is engaged;
   a clutch apply piston;
   a hydraulic pressure source in selective fluid communication with the clutch apply piston to apply pressure to the move the piston into contact with the first set of plates to engage the clutch;
   an electrically-powered actuator with a first member movable in opposing first and second directions in response to electrical power, a contacting member interfacing with the first member and movable into and out of contact with the clutch apply piston in response to movement of the first member in the first and second directions, respectively; and wherein the first member has a locking mechanism configured to prevent movement of the contacting member relative to the first member in the absence of electrically-powered movement of the first member, so that the actuator locks the clutch in an engaged state after the hydraulic pressure has moved the piston into contact with the plates to permit cessation of the hydraulic pressure and maintaining the engaged state without hydraulic pressure;
   a housing forming a hydraulic chamber in fluid communication with the pressure source and with the clutch apply piston; wherein the hydraulic chamber fills with pressurized fluid to engage the clutch and is emptied of pressurized fluid when the actuator locks the clutch in the engaged state; and wherein the hydraulic chamber and the actuator are radially displaced from one another and from the first clutch member.

4. The clutch actuation system of claim 3, wherein the first member is a lead screw and the first and second directions are clockwise and counterclockwise rotation; wherein the second member is an axial travel nut threadingly engaged with the lead screw and movable axially toward and away from the clutch in response to rotation of the first member; and wherein the contacting member extends axially toward the apply piston from the axial travel nut.

5. The clutch actuation system of claim 4, further comprising an axial thrust bearing positioned concentrically about the lead screw.

6. The clutch actuation system of claim 3, further comprising:
   an electric motor operatively connected to the first member;
   a battery; and
   a controller operatively connecting the battery and the electric motor to control the flow of power from the battery to the motor.

7. A method of controlling engagement of a transmission clutch in a transmission comprising:
   determining a desired gear ratio of the transmission;
   directing pressurized fluid to an apply piston to thereby move the piston into contact with the clutch to engage the clutch and establish the desired gear ratio;
   after said directing pressurized fluid, providing electrical power to an actuator to thereby move the actuator into contact with the piston; wherein electrical power ceases when the actuator contacts the piston; wherein the actuator has a self-locking feature to prevent movement of the actuator in the absence of electrical power thereto; and
   after said providing electrical power, releasing the pressurized fluid so that the clutch is maintained in an engaged state via the actuator without electrical power or fluid pressure.

8. The method of claim 7, further comprising:
   after said releasing the pressurized fluid, directing pressurized fluid to the apply piston with the clutch in the engaged state;
   after said directing pressurized fluid to the apply piston with the clutch in the engaged state, providing electrical power to the actuator to move the actuator out of contact with the piston; and
   after said providing electrical power to the actuator to move the actuator out of contact with the piston, releasing the pressurized fluid so that the apply piston moves out of contact with the clutch and the clutch is released to an unengaged state.

* * * * *